(No Model.)

W. OLIPHANT.
FILTERING APPARATUS.

No. 524,835. Patented Aug. 21, 1894.

Witnesses:
J. B. McGirr.
J. S. Barker.

Inventor.
William Oliphant
by Geo. K. Graham
atty.

United States Patent Office.

WILLIAM OLIPHANT, OF PATERSON, NEW JERSEY, ASSIGNOR TO HELEN OLIPHANT, OF SAME PLACE.

FILTERING APPARATUS.

SPECIFICATION forming part of Letters Patent No. 524,835, dated August 21, 1894.

Application filed December 14, 1892. Serial No. 455,186. (No model.)

*To all whom it may concern:*

Be it known that I, WILLIAM OLIPHANT, a citizen of the United States, residing at the city of Paterson, in the county of Passaic and State of New Jersey, have invented certain new and useful Improvements in Filtering Apparatus, fully set forth in the following specification and represented in the accompanying drawings.

This invention relates to apparatus for the purification of water or other liquid by mechanical filtration under pressure.

The present invention has for its object to increase the efficiency of this class of apparatus and to generally improve its structure.

In the apparatus embracing the invention the liquid is subjected to three separate filtrations, that is to say, it is passed through three separate filtering beds or masses of filtering material, the course of the liquid being downward through the first bed—of comparatively coarse material, from thence upward through the second bed—of comparatively fine material, and it may be a different material from that in the first bed, and thence downward through the third bed of the same material, or a finer material, and it may also be of a different material to both the first and second beds. The apparatus also embraces a means for automatically cleansing each of the filtering beds, with a conical settling or sediment collecting chamber common to two of the filtering beds and through which the liquid passes before passing through the second and final filtering beds; all of which will be more fully hereinafter set forth.

The accompanying drawings illustrate a practical embodiment of the invention, in which—

Figure 1:
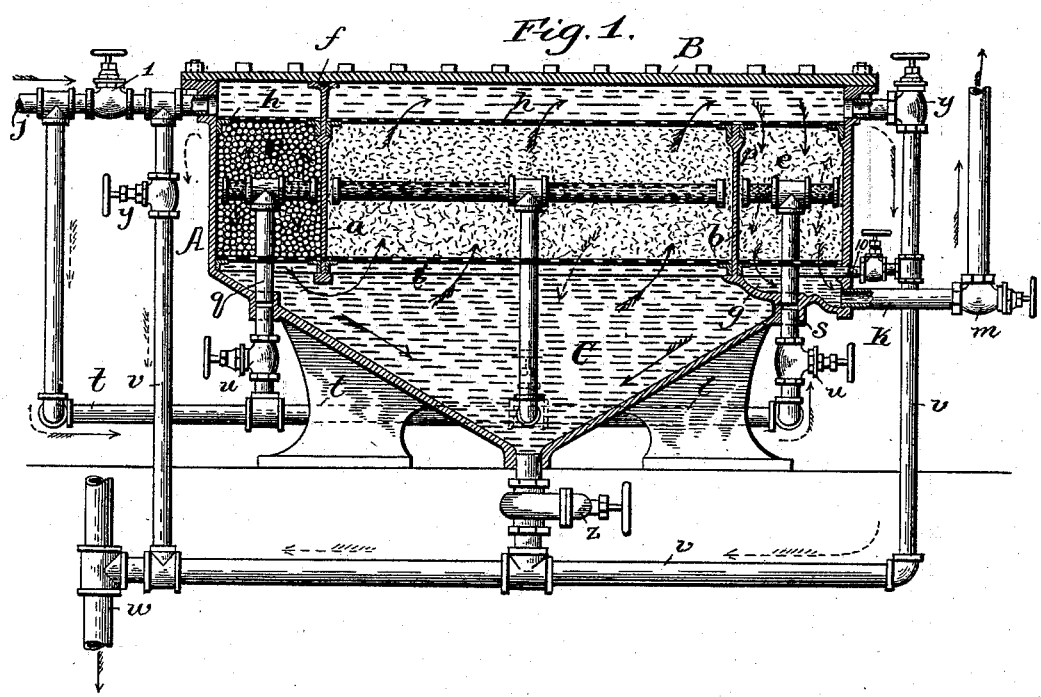
Figure 2:
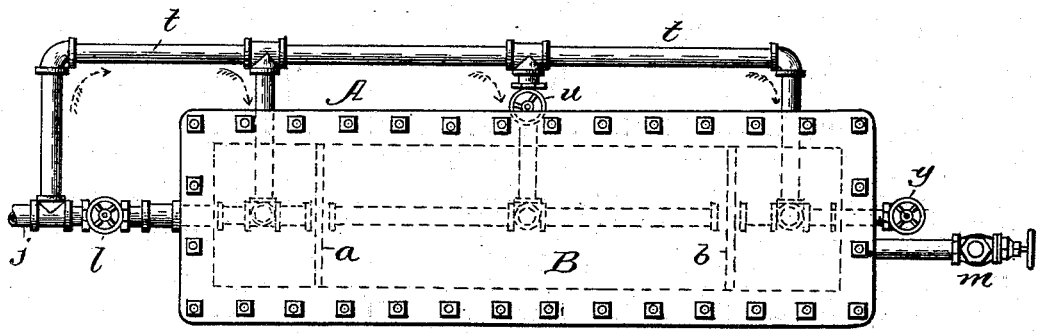

Figure 1 is a vertical transverse sectional elevation of the filtering apparatus; and Fig. 2 is a plan view thereof.

In its general construction the apparatus consists of a rectangular filter structure A of considerably greater length than width, provided with a sealed covering plate B, tightly bolted to the flanges of the vertical walls of the structure. These vertical walls merge at their lower ends into downwardly tapering walls which form a lower and conical settling or sediment chamber C. The interior of the structure is provided with two vertical partitions $a$, $b$, extending across from wall to wall providing three separate filtering bed chambers, $c$, $d$, $e$. The partition $a$, extends upward to and in close contact with the under side of the covering plate B, and the joint between the two is properly sealed as by a packing $f$; the lower end of the partition falling short of meeting the wall of the conical sediment chamber and leaving a free space below it. The partition $b$, extends from a point a little below the covering plate leaving a space above it for the flow of the water over it down and joining a partition $g$, meeting the walls of the conical sediment chamber, thereby cutting off said latter chamber from the filtering bed-chamber $e$. The chambers $c$, $d$, $e$, are each provided with a top and bottom diaphragm formed by reticulated plates $h$, $i$, or by suitable wire or other screens, between which each of the chambers are filled with suitable filtering material that rests upon the lower plate or screen and is properly confined by both the upper and lower screens. The first chamber $c$ will preferably be packed with comparatively coarse filtering material and will form the first filtering bed; the second chamber $d$, will be packed with comparatively fine filtering material which may be the same or different from that in the first chamber and will form the second or intermediate filtering bed; and the third chamber $e$, will be also packed with a comparatively fine filtering material or finer material than that of the second bed and of different or the same material and form the third or final filtering bed.

The liquid is conducted from its source of supply by an induction pipe $j$ at the upper part of the filter structure into the top of the chamber $c$ above the filtering bed, thence it will pass downward through said filtering bed into the settling chamber C filling said chamber, thence upward through the second or intermediate filtering bed into the space above it, thence over the top of the partition $b$, and downward through the third or final filtering bed and outward through an eduction pipe $k$ for use. The induction pipe is provided with a stop valve $l$, and the eduction pipe with a similar valve.

From the foregoing it will be seen that the liquid is subjected to two downward filtrations, and one upward one. Of course, it is obvious that the course of the liquid might be the reverse of that described, as for instance upward through the chamber e, downward through the chamber d, then upward through the chamber c, and thence outward for use; but the course shown and previously described is the preferred one. The means for cleansing each of these filtering beds may, it will be apparent, be of any convenient and suitable form. Thus, there is shown what has heretofore been found to be an effective and rapid means, consisting in providing each filtering bed with perforated pipes n, o, p, extending horizontally and about centrally within the bed of material and connected by T's and vertical pipes q, r, s, also perforated along the portions within the filtering beds and each connected to a single supply pipe t, with the induction pipe j upon the source of supply-side of its stop valve l. Each of the vertical pipes q, r, s, has a stop valve u, by which the cleaning liquid may be cut off or turned on at will to each of the filtering beds independently, so that each may be cleansed separately and in succession or simultaneously.

During the cleansing operation, of course, the stop valve l of the induction pipe will be closed down and the water permitted to pass from the filtering beds and chambers c, d, e, through discharge pipes v, which communicate with the interior and at the upper part of the filter structure as shown and thence out by a waste pipe w. Each of the discharge pipes v will also be provided with stop valves y which will be closed during the filtering process, and opened while the cleansing is taking place. The sediment collecting in the conical chamber C will, owing to its shape, fall and accumulate at the bottom thereof, and this may be discharged from time to time by opening a valve z in a pipe connecting said chamber with the discharge pipe v. In like manner the sediment that may collect in the lower part of the chamber e below the bottom plate or screen of the filtering bed may be discharged by a pipe 10 communicating therewith and with the discharge pipe v, said pipe 10 also having a stop valve to close and open it.

The material of each of the filtering beds may be conveniently renewed when found desirable by removing the covering plate B and raising the upper recticulated plate or screen h as will be apparent.

The occasion for cleansing the filter beds will be comparatively infrequent because of the work being shared appropriately by the coarse and the fine filtering materials but when they become fouled the operation previously described may be readily and quickly resorted to without the necessity of stopping the flow of filtered liquid for but a short time.

What is claimed is—

1. The herein described filtering apparatus consisting of a closed casing having at its bottom an inverted cone-shaped chamber, two vertical cross partitions with top and bottom horizontal perforated diaphragms forming with the walls of the casing three separated filtering beds, the cone-shaped chamber forming a communicating lower passage between two of the beds, another passage forming an upper communication between two of the beds, an induction pipe communicating with the top of one bed and an eduction pipe with the bottom of the third bed, and a discharge pipe having a valve communicating with the apex of the cone shaped chamber.

2. The herein described filtering apparatus consisting of a closed casing having an inverted cone shaped bottom chamber, two vertical cross-partitions, the upper end of one extending to the top of the casing and the lower end of the other to the inclined wall of the bottom chamber, top and bottom perforated diaphragms forming with the partitions and the walls of the casing three filtering beds, induction and eduction pipes connecting with said beds, cleansing pipes leading to each of the beds, and waste pipes communicating with two of the beds and with the apex of the cone-shaped chamber.

In witness whereof I have hereunto set my hand in the presence of two subscribing witnesses.

WILLIAM OLIPHANT.

Witnesses:
E. L. TODD,
GEO. H. GRAHAM.